US007219331B2

(12) United States Patent
Pabla (10) Patent No.: US 7,219,331 B2
(45) Date of Patent: May 15, 2007

(54) METHOD AND APPARATUS FOR LIGHTWEIGHT SUPPORT ON SET TOP BOX

(75) Inventor: Kuldipsingh Pabla, Santa Clara, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 1152 days.

(21) Appl. No.: 09/809,392

(22) Filed: Mar. 14, 2001

(65) Prior Publication Data

US 2002/0184608 A1   Dec. 5, 2002

(51) Int. Cl.
*G06F 9/44* (2006.01)
(52) U.S. Cl. .................. 717/120; 717/118; 717/148
(58) Field of Classification Search ........ 717/102–148; 715/763–764
See application file for complete search history.

(56) References Cited

U.S. PATENT DOCUMENTS

| 5,721,848 | A | 2/1998 | Joseph | |
|---|---|---|---|---|
| 6,429,882 | B1 * | 8/2002 | Abdelnur et al. | 715/763 |
| 6,442,748 | B1 * | 8/2002 | Bowman-Amuah | 717/108 |
| 6,601,233 | B1 * | 7/2003 | Underwood | 717/102 |
| 6,636,242 | B2 * | 10/2003 | Bowman-Amuah | 715/764 |
| 6,701,514 | B1 * | 3/2004 | Haswell et al. | 717/115 |
| 6,718,535 | B1 * | 4/2004 | Underwood | 717/101 |
| 2003/0212987 | A1 * | 11/2003 | Demuth et al. | 717/130 |

FOREIGN PATENT DOCUMENTS

EP  1 008 930 A  6/2000

OTHER PUBLICATIONS

Creating a GUI with JFC/Swing, The Java™ Tutorial [online], [retrieved on Apr. 20, 2000]. Retrieved from the Internet: <URL: http://java.sun.com/docs/books/tutorial/uiswing/index.html>.
Getting Started with Swing, The Java™ Tutorial [online], [retrieved on Apr. 20, 2000]. Retrieved from the Internet: <URL: http://java.sun.com/docs/books/tutorial/uiswing/start/index.html>.
Kathy Walrath, Lightweight Components [online], [retrieved on Apr. 11, 2000]. Retrieved from the Internet: <URL: http://java.sun.com/products//jdk/1.2/docs/guide/awt/demos/lightweight/index.html>.

(Continued)

*Primary Examiner*—Meng-Ai T. An
*Assistant Examiner*—Mark P Francis
(74) *Attorney, Agent, or Firm*—Martine Penilla & Gencarella, LLP (57) ABSTRACT

A Lightweight component is made focus traversable by creating a pseudo native windowing system widget for each and every Lightweight component. This pseudo native widget has no geometry associated with it and does no rendering of the component since rendering of Lightweight components is done in Java. The pseudo native widget lives on the native windowing system's list of widgets and occupies a real estate thereby causing the native windowing system to attach a native structure with each and every Lightweight component, thus giving the windowing system accessibility to the Lightweight components. Since the pseudo native widgets are on the list of regular widgets, focus navigation for Lightweights become consistent with regular windowing system widgets, making the Lightweight components visible to all focus navigation events.

18 Claims, 4 Drawing Sheets

OTHER PUBLICATIONS

Java(TM) 2 Platform, Standard Edition, v1.2.2 API Specification: Class Component [online], [retrieved on Apr. 11, 2000]. Retrieved from the Internet: <URL: http://java.sun.com/products//jdk/1.2/docs/api/java/awt/Component.html>.

Java(TM) 2 Platform, Standard Edition, v1.2.2 API Specification: Class Container [online], [retrieved on Apr. 11, 2000]. Retrieved from the Internet: <URL: http://java.sun.com/products//jdk/1.2/docs/api/java/awt/Container.html>.

Java(TM) AWT: Lightweight UI Framework [online], [retrieved on Apr. 11, 2000]. Retrieved from the Internet: <URL: http://java.sun.com/products/jdk/1.1/docs/guide/awt/designspec/lightweights.html>.

Java(TM) AWT: Mouseless Operation [online], [retrieved on Nov. 15, 2000]. Retrieved from the Internet: <URL: http://java.sun.com/products/jdk/1.1/docs/guide/awt/designspec/mouseless.html>.

Amy Fowler, Mixing Heavy and Light Components, The Swing Connection [online], [retrieved on Jan. 4, 2001]. Retrieved from the Internet: <URL: http://java.sun.com/products/jfc/tsc/articles/mixing/index.html>.

Amy Fowler, Painting in AWT and Swing, The Swing Connection [online], [retrieved on Jan. 4, 2001]. Retrieved from the Internet: <URL: http://java.sun.com/products/jfc/tsc/articles/painting/>.

Eric Armstrong, Understanding Containers, The Swing Connection [online], [retrieved on Jan. 5, 2001]. Retrieved from the Internet: <URL: http://java.sun.com/products/jfc/tsc/articles/containers/index.html>.

Motif 2.1 Data Sheet [online], [retrieved on Aug. 23, 2001]. Retrieved from the Internet: <URL: http://www.opengroup.org/motif/motif.data.sheet.htm>.

Introduction to Windows Concepts [online], [retrieved on Aug. 23, 2001]. Retrieved from the Internet: <URL: http://www.aw.com/cseng/titles/0-201-63492-9/chap1.html>.

WebMail Installation Guide, Release 3.0, 1998, Magma Communications Ltd.

Get on the Internet Today with MSN® TV (formerly Web TV®) [online], [retrieved on Aug. 24, 2001]. Retrieved from the Internet: <URL: http://www.msntv.com/default.htm>.

MSN TV Questions [online], [retrieved on Aug. 24, 2001]. Retrieved from the Internet: <URL: http://www.msntv.com/questions.html>.

Getting Online: Using Internet Access Products, MSN TV Privacy Statement [online], [retrieved on Aug. 24, 2001]. Retrieved from the Internet: <URL: http://www.msntv.com/pcvstv.html>.

DWL Unifi Engine™ Real-time Transactional Technology: The Foundation for Successful Business, White Paper, 1996.

\* cited by examiner

METHOD AND APPARATUS FOR LIGHTWEIGHT SUPPORT ON SET TOP BOX

BACKGROUND OF THE INVENTION

1. Field of the Invention

This invention relates to the field of computer applications, and, more specifically, to support of Java lightweight devices on set top boxes.

Sun, Sun Microsystems, the Sun logo, Java, Java 3D and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Computer systems with display devices (e.g. screen) generally provide users with ways to move around (i.e. navigate) the display devices. Usually, a display device employs a Graphical User Interface (GUI) to pictorially present to the user objects of possible interest. These screen objects, also known as components, may cause a computer to perform other functions or they may just represent a non-functional simple picture of an object.

One type of object of interest in this specification is the heavyweight component. Heavyweight components are those components that have their own associated native screen resource (commonly known as peer) therefore are registered with the native windowing system (i.e. the underlying engine that controls the GUI). Heavyweight components are opaque and are navigable by any means available for navigation on the computer system. Means of navigation include but are not limited to the use of a pointing device such as a mouse, touching of the object on a touch screen, traversing through the objects by the use of keyboard elements, and remote control means. Navigating through a user interface using keyboard elements such as cursor keys and keypad keys is known as focus navigation. For example, a user can give focus to different heavyweight objects on a display screen by the use of the Tab and Shift Tab keys. An object that has focus is highlighted and is available to receive other keyboard events—the object is said to have event focus. As the user hits the Tab key, a different object is highlighted. However, there could exist windowing objects on the user interface screen that do not highlight when the user navigates by use of the Tab or other keyboard keys. These objects are known as Lightweight components.

Lightweight components are components which do not have native opaque windows (i.e. no structure or peer classes in the native windowing system engine) associated with them, but borrow the screen real estate of a heavyweight ancestor. Unlike heavyweight components, a lightweight component is a screen element that does not need a corresponding peer element in the native layer and thus supports transparencies. These elements typically look the same on different platforms because they are implemented in Java or other device independent language. Since there is no native layer element, the native layer is not necessarily aware of the lightweight element.

In user interfaces where neither a touch screen nor a pointing device is used, users often navigate among objects and activate them using a keyboard or keyboard equivalent. For example, a user may employ a remote control or other non-pointing input device to navigate amongst available objects on a user interface screen. A typical approach employs a "cursor" highlight to indicate the current object (i.e. user interface widget or link) that has focus. Once an object on the display has focus, it is possible to activate/drive the object using further defined keystrokes. For example, using a "select" button or equivalent, the user can initiate an action for the currently highlighted object (i.e. object that has focus).

Using arrow (cursor) keys on a keyboard, remote control, or other device, the user can move the cursor to the "next" object in an up, down, right, or left direction. This works fine with the native (e.g. local platform) windowing system widgets and hyper links. The native windowing system keeps all the information about the native widgets (i.e. heavyweight components). This makes navigation amongst the native widgets seamless. The Java Lightweight Components are widgets which are not visible/accessible to the underlying native windowing system and since Java has no built-in windowing system to manage the Lightweight Components, it is not feasible to navigate around a user interface screen when there are no pointing devices.

In Java, a Lightweight widget gets event focus when the point (i.e. the coordinates on the GUI) of the event is within the boundaries (i.e. geometry) of the widget. A navigation event is delivered to the Heavyweight ancestor widget associated with the Lightweight widget, which in turn dispatches the event to all its components. The Lightweight widget decides if the event occurred within its geometry and if so, grabs it. However, it is difficult to designate the point of a navigation event without a pointing device. Therefore, there is a need for a solution for Lightweight components that is consistent with Native widgets in the navigation models.

Note that the cursor navigation approach described above is typically used in set top boxes and other information "appliances" where it is considered undesirable to provide a mouse or other pointing device. However, the fundamental navigation problem described herein also applies to a PC environment in which the user is navigating via a keyboard mechanism and choosing not to use a mouse.

In all of these cases, an issue to be solved both technically and from the point of view of the user interacting with the system is the question of how to send various windowing events (e.g. commands) to Java Lightweight Components so that they behave like regular windowing System Widgets. For example, there is a need for Lightweight widgets to behave consistently with the regular Windowing System Widgets during navigation (i.e. lightweight components should receive event focus by use of any available navigation method).

Environments such as Motif, Windows, Sun Webmail 3.x, and WebTV provide keyboard navigation schemes that support moving a cursor from one user interface object to another however, these environments do not currently provide good support for Lightweight Components. On desktops, a Lightweight component receives focus when a user performs an event such as clicking in its bounding regions. Native windowing system (Windows/Motif/DWL) forwards this event to native parent container associated with the Lightweight. The container, in turn, dispatches this event to all the Lightweights it contains. Each Lightweight checks whether the event happened in its bounding regions (not necessarily bounding rectangle) and if so, consumes it and claims it.

In most instances, the native containers associated with Lightweights are not FocusTraversable widgets. Focus traversal is the ability to use keystrokes (not the mouse) to traverse components capable of accepting keyboard focus.

Those keystrokes are defined to be <Tab> to move forward and <Shift-Tab> to move backward. Once the focus is owned by a component then it should be possible to activate/drive that component with further defined keystrokes (such as <space> to press a Button). It is the responsibility of the component to implement the proper activation once it has focus. A component which is capable of accepting focus in this way should always render some form of visual feedback when it gets focus so that the user can easily see which component has focus as the user traverses using Tab/Shift-Tab. Typically this feedback takes the form of a colored bounding box drawn around the component. The native toolkits on each platform provide varying degrees of support for focus traversal by default. However, explicit support for focus traversal is implemented in the common Java AWT (Advanced Windowing Toolkit) code so that the behavior is more consistent across platforms.

In a set-top box/information appliance environment, where there are no pointing devices provided for user input, there is no way to send focus and focus events to these Java Components. This invention becomes even more crucial for the user's interactions with the product.

Image Maps

The existing solution supports Lightweights being handled as Image maps. Image maps are images in Web pages that include hot regions (i.e., hotspots). An image map in a Web page has three components, an image, a set of map data, and an HTML host entry. The image is a normal Web image, typically stored in the GIF or JPEG format. The map data set is a description of the mapped regions within the image. The host entry is HTML code that positions the image within the Web page and designates the image as having map functionality.

An Image map has a special behavior for the widgets expecting mouse events. A mouse like arrow image is popped up to simulate mouse events for these widgets. The simulation generates mouse down, up, click, move and drag events. The arrow movement is very slow and makes the user interface (UI) inconsistent with the rest of the UI model for a Set Top Box. In the existing solution, a native widget associated with Lightweight(s) is made focusTraversable and is handled like an Imagemap, thereby simulating mouse events. This causes undesirable problems in the User Interface model.

For example, in the prior art the Native container associated with a Lightweight is considered to be an imagemap therefore all the Components contained in this Container are handled like an imagemap. This is the case even if the other components are not expecting mouse events and hence should not be considered as imagemap. Handling of Lightweights as imagemaps lead to undesirable User Interface models that significantly slow down user interaction such as requiring unnecessarily complex user operations to accomplish a simple navigation task.

Also, a Lightweight component implementing any of the P-Java specific Interfaces such as NoInputPreferred, and KeyboardInputPreferred may never get focus events when the Lightweight component is treated as an imagemap. This is because the native windowing System does not know anything about the Lightweights. This leads to inconsistency between Java-Native widgets and the Lightweights.

SUMMARY OF THE INVENTION

In computer systems where it is either not possible to use a pointing device or where it is not advantageous to use a pointing device, focus navigation (i.e. providing focus events) of Lightweight components is difficult at best. In one embodiment of the present invention, a Lightweight component is made focus traversable by creating a pseudo native windowing system widget for each and every Lightweight component. This pseudo native widget has no geometry associated with it and does no rendering of the component since rendering of Lightweight components is done in Java.

The pseudo native widget lives on the native windowing system's list of widgets and occupies a real estate thereby causing the native windowing system to attach a native structure with each and every Lightweight component, thus giving the windowing system accessibility to the Lightweight components. Since the pseudo native widgets are on the list of regular widgets, focus navigation for Lightweights become consistent with regular (i.e. heavyweight components) windowing system widgets, making the Lightweight components visible to all focus navigation events. Once a Lightweight widget has focus, it can have all subsequent events delivered to it.

DETAILED DESCRIPTION OF THE INVENTION

The invention comprises a method and apparatus for support of Java Lightweight devices on set top boxes. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Lightweight components are generally written in languages that are device independent and are designed to be transparent to the native system. For example, Java Lightweight components are written in pure Java code. Because a Lightweight component is transparent to the native system, there is no native component associated with the lightweight component. Thus making lightweight components difficult to give focus without the use of a pointing device.

On desktop systems with a pointing device (e.g. a mouse), a user clicks on the lightweight component to give it focus. Once a component (lightweight or heavyweight) gets focus (i.e. becomes focus-traversable), it starts to accept focus and other events. Various computer systems either do not have pointing devices or a user may choose to navigate without the pointing device. In some cases, it is advantageous to navigate without a pointing device such as when a "power user" desires accelerated operation, or for disabled access, or to avoid repetitive stress injury. In these cases and in systems without pointing devices, it is difficult to provide focus navigation (i.e. use of the cursor keys or any other set of keys on the keyboard) for lightweight components.

In one or more embodiments of the present invention, a pseudo native component is created for each lightweight component. The pseudo native component makes focus navigation possible on lightweight components. A pseudo native component acts as real estate holder for holding the location and size of a component. In one embodiment, these pseudo native components have no geometry associated with them and no rendering of the lightweight components are performed. Rendering of Lightweight components are done in Java.

The native windowing system maintains a list of its native components and each newly created pseudo native component is included on the list of components and occupies a real estate. Therefore, the native windowing system attaches a native structure to the Lightweight component, thus providing windowing system accessibility to the Lightweight component. Because the pseudo native components reside in the list of regular components, focus navigation is consistent with the native windowing system widgets, thus making Lightweight components visible to the native windowing system such that all events may be seen by these pseudo native components. For example, events that are available for native components like "focus" and "resize" may now be performed on these Lightweight components.

Figure 1:
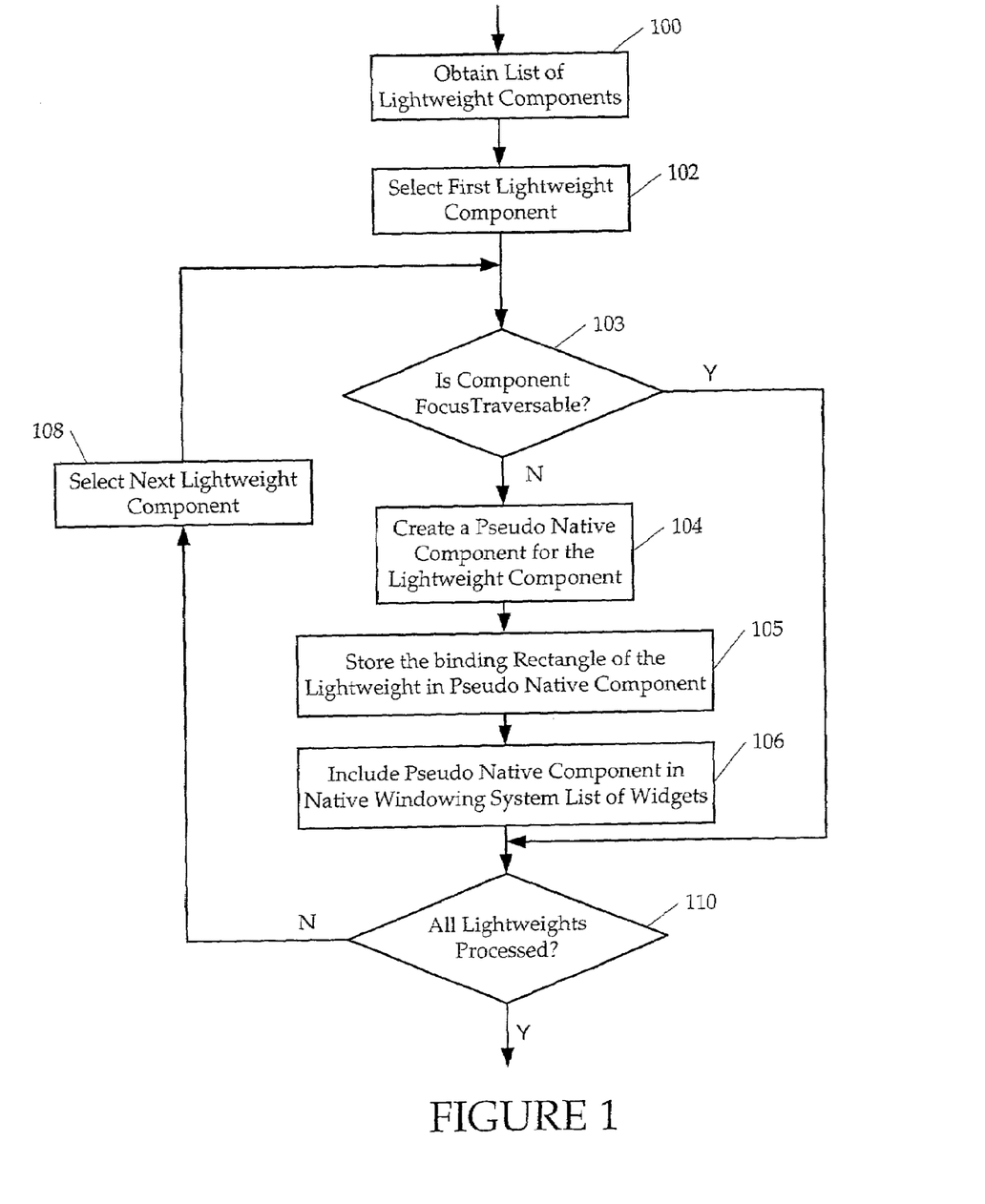
FIG. 1 shows a flowchart of a method for creating pseudo native components for Lightweight components in accordance with an embodiment of the present invention.

FIG. 1 shows a flowchart of a method for creating pseudo native components for Lightweight components in accordance with an embodiment of the present invention. A list of all Lightweight components is generated (e.g. at step 100) for processing. This list may be limited to the Lightweight components that need to be focus traversable. During processing, a Lightweight component is selected from the list (e.g. at step 102) and check to determine if it is focus traversable (at step 103). If the Lightweight component is not focus traversable, a pseudo native component is created for the selected Lightweight component (e.g. at step 104) and processing proceeds to step 105. However, if the selected Lightweight component is focus traversable, processing proceeds to step 110 for determination if continued processing is needed.

At step 105, the binding rectangle of the selected Lightweight component is stored in the newly created pseudo native component (from step 104) and the native windowing system includes the newly created pseudo widget in its list of native widgets (at step 106). Processing continues at step 110. If at step 110, there are more Lightweight components to process, processing continues at step 108 to select a new Lightweight component to make focus traversable. From step 108, processing returns to step 103 to continue generation of pseudo native components until all the Lightweight components have been processed (i.e. when pseudo native components have been created for all Lightweight components).

When all the Lightweight components have been processed (e.g. at step 110), processing exits. These pseudo native components behave like heavyweight (regular) components which are focus traversable in the native windowing system. A heavyweight component is one that is associated with its own native screen resource (commonly known in the art as a peer), whereas a lightweight component is one that "borrows" the screen resource of an ancestor (which means it has no native resource of its own—so it's "lighter").

In one embodiment of the present invention, Lightweight components are made focus traversable by extending the current awt.java.Toolkit.LightweightPeer class and changing the Application Programming Interfaces (APIs) as required (e.g. setVisible, setBounds). For example, createComponent( ) for Lightweight returns CTGLightweightPeer instead of LightweightPeer where CTGLightweight is platform specific implementation. Depending on the APIs implemented in the native system, event mapping may be required between Java and the native system. For example, a translation table may be required to map focus events between the native system and Java components.

The code sequence below shows example of an embodiment used in the present invention to extend the capabilities of Lightweight components. It implements the LightweightPeer interface for use in lightweight components that have no native window associated with them. This gets created by default in Component so that Component and Container can be directly extended to create useful components written entirely in Java. These components must be hosted somewhere higher up in the component tree by a native container such as a Frame.

This implementation provides no useful semantics and serves only as a marker. Alternative implementations in Java may be provided that do something useful for some of the other peer interfaces to minimize the native code.

---

CTGLightweightPeer.java

---

```
package sun.awt.ctg;
import java.awt.*;
import java.awt..image.*;
class CTGLightweightPeer extends CTGComponentPeer
implements java.awt.peer.LightweightPeer {
    private native void create( CTGComponentPeer peer.int model);
        public CTGLightweightPeer (Component.target) (
            super (target, true);
            Container parent = target.getParent ( );
            CTGComponentPeer peer = this;
            while (parent != null &&
                   parent.getPeer ( ) instanceof java.awt.peer.LightweightPeer)
                parent = parent.getParent ( );
            if (parent != null) {
                peer = (CTGComponentPeer) parent.getPeer ( );
            }
            create( peer, mode);
            initialize( );
```

-continued

CTGLightweightPeer.java

```
    }
    public boolean isFocusTraversable( ) {
        return false;
    }
    public void paint (Graphics g) {
        System.out.println ( "LTWT=paint");
    }
    public void repaint (long tm, int x, int y, int width, int height) {
        System.out.println { "LTWT: repaint");
    }
    public void print (Graphics g) {
    }
    public boolean handleEvent (Event a) {
        // super.requestFocus ( );
            return false;
    }
    public void handleEvent(java.awt.ANTEvent arg0) {
    }
    public Dimension getPreferredSize ( ) {
        return new Dimension(1,1};
    }
    public Dimension getMinimumSize( ) {
        return new Dimension (1,1);
    }
    public java.awt.Toolkit getTookit( ) {
        return null;
    }
    public java.awt.image.ColorModel getColorModel( ) {
        return null;
    }
    public Graphics getGraphics( ) {
        return null;
    }
    public FontMetrics getFontMetrics(Font font) {
        return null;
    }
    public void setForeground(Color c) {
    }
    public void setBackground (Color c) {
    }
    public void setFont(Font f) {
    }
    public void setCursor(Cursor cursor) {
        System.out.println ( "LTWT=setCursor");
    }
    public Image createImage(ImageProducer producer) {
        return null;
    }
    public Image createImage(Int width, int height) {
        return null;
    }
    public boolean prepareImage(Image img, int w, int h, ImageObserver o) {
        return false;
    }
    public int checkImage(Image img, int w, int h, ImageObserver o) {
        return 0;
    }
    public Dimension preferredSize( ) {
        return getPreferredSize( );
    }
    public Dimension minimumsize( ) {
        return getMinimumSize {};
    }
    public Point getLocationOnScreen( ) {
        return null;
    }
}
```

Since the declaration:
  CTGLightweightPeer extends CTGComponentPeer implements java.awt.peer.LightweightPeer shows that CTGLightweightPeer is extending CTGComponentPeer, it is therefore duplicating the behavior of a heavyweight component where required, for example, during focus navigation.

Figure 2:
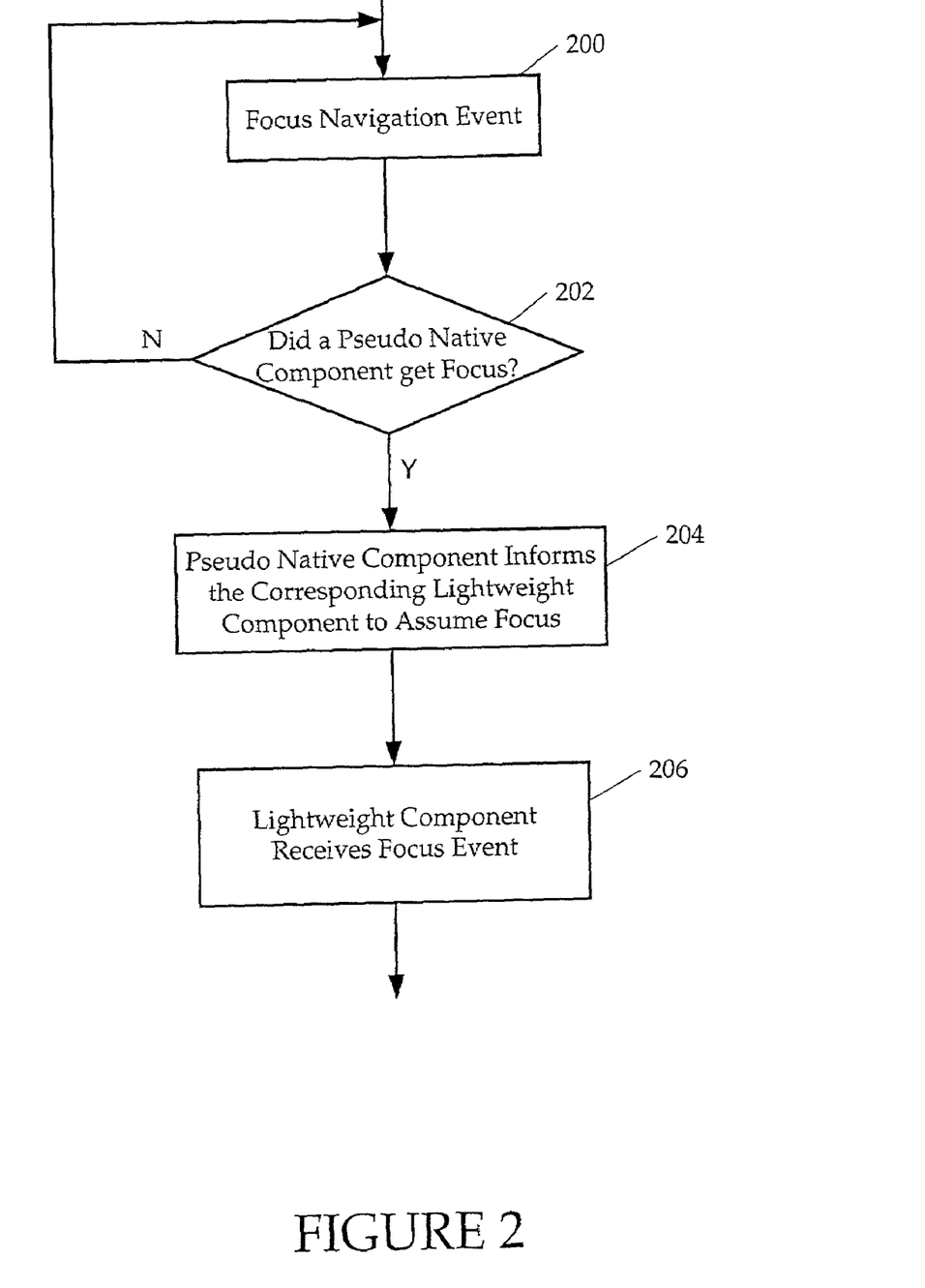
FIG. 2 is a flow diagram illustrating how Lightweight components receive focus events in accordance with an embodiment of the present invention.

FIG. 2 is a flow diagram illustrating how the Lightweight components receive focus events in accordance with an embodiment of the present invention. As the user is focus navigating at step 200 (i.e. using cursor keys or keyboard keys), if at step 202 the pseudo native component receives a focus event, the pseudo native component informs the corresponding Lightweight component to assume focus thereafter, the Lightweight component starts receiving focus events at step 206.

As explained previously in this specification, the pseudo native components make the Lightweight components behave like heavyweight/regular components.

EMBODIMENT OF A PROCESSING ENVIRONMENT

An embodiment of the invention is directed, though not limited, to making Lightweight components focus traversable during mouseless operation and consistent with heavyweight components. Such Lightweight components are implemented using object-oriented programming environments that produce executable software objects. The Lightweight components execute within a virtual machine environment since they are machine independent and are generally implemented using bytecode class files. The following description refers to an embodiment of a virtual machine-based runtime environment, though it will be obvious that the invention is not limited to such.

Applications typically comprise one or more object classes. Classes written in high-level programming languages, such as the Java™ programming language, may be compiled into machine independent bytecode class files. Alternatively, classes may be compiled into machine dependent, executable program code for direct execution by a given hardware platform. In the machine independent case, each class file contains code and data in a platform-independent format called the class file format. The computer system acting as the execution vehicle contains a program called a virtual machine, which is responsible for executing the code in each class file. (A hardware system may also be used that directly executes bytecode of class files.)

In a virtual machine environment, the classes of an application are loaded on demand from the network (stored on a server), or from a local file system, when first referenced during the application's execution. The virtual machine locates and loads each class file, parses the class file format, allocates memory for the class's various components, and links the class with other already loaded classes. This process makes the code in the class readily executable by the virtual machine.

Figure 3:
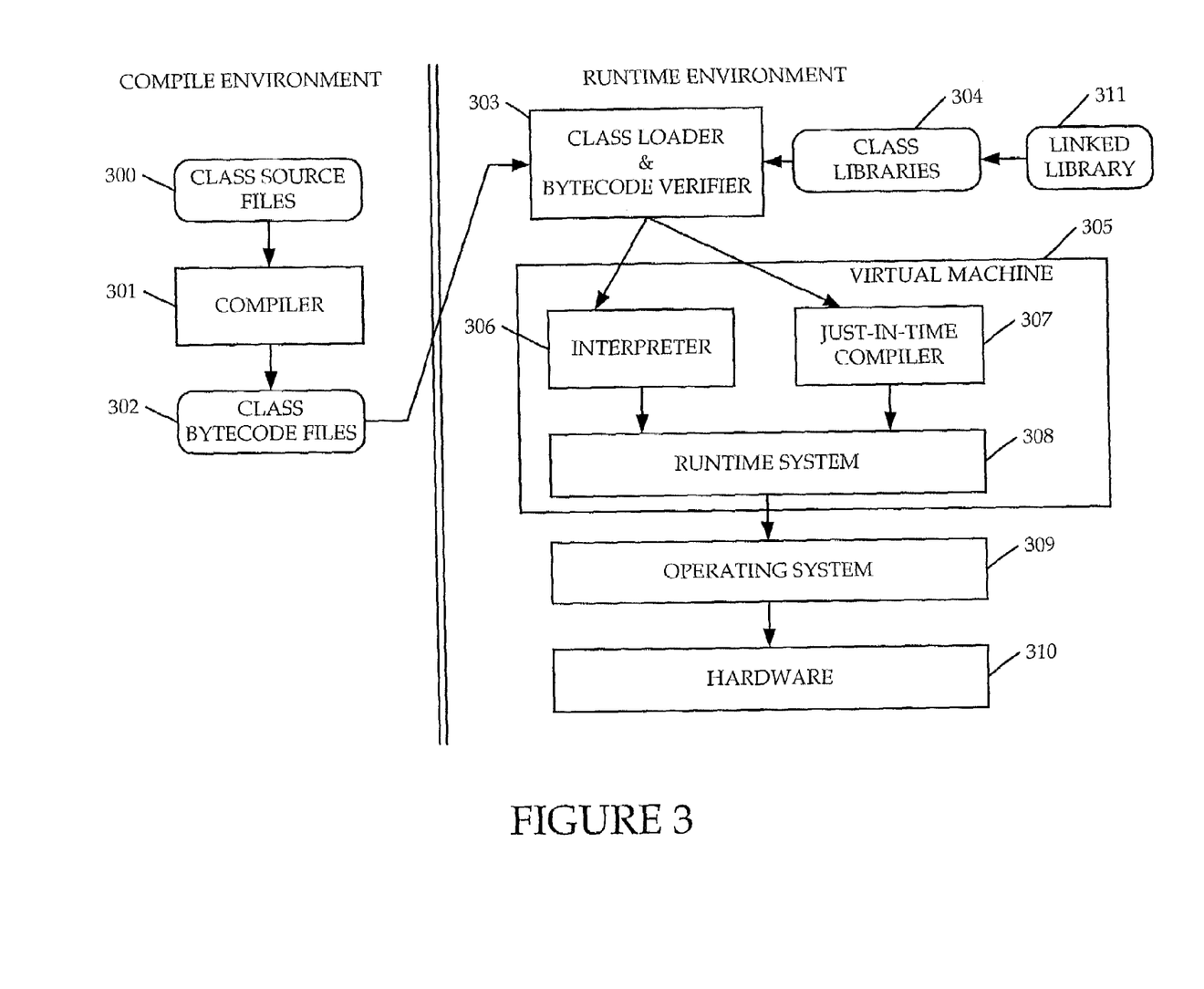
FIG. 3 illustrates a compile and runtime environment for an example processing system for an embodiment of the invention.

FIG. 3 illustrates the compile and runtime environments for an example processing system. In the compile environment, a software developer creates source files 300, which contain the programmer readable class definitions written in the source programming language, including data structures, method implementations and references to other classes. Source files 300 are provided to pre-compiler 301, which compiles source files 300 into "class" files 302 that contain bytecodes executable by a virtual machine. Bytecode class files 302 are stored (e.g., in temporary or permanent storage) on a server, and are available for download over a network. Alternatively, bytecode class files 302 may be stored locally in a directory on the client platform.

The runtime environment contains a virtual machine (VM) 305 which is able to execute bytecode class files and execute native operating system ("O/S") calls to operating system 309 when necessary during execution. Virtual machine 305 provides a level of abstraction between the machine independence of the bytecode classes and the machine-dependent instruction set of the underlying computer hardware 310, as well as the platform-dependent calls of operating system 309.

Class loader and bytecode verifier ("class loader") 303 is responsible for loading bytecode class files 302 and supporting class libraries 304 into virtual machine 305 as needed. Class loader 303 also verifies the bytecodes of each class file to maintain proper execution and enforcement of security rules. Within the context of runtime system 308, either an interpreter 306 executes the bytecodes directly, or a "just-in-time" (JIT) compiler 307 transforms the bytecodes into machine code, so that they can be executed by the processor (or processors) in hardware 310.

The runtime system 308 of virtual machine 305 supports a general stack architecture. The manner in which this general stack architecture is supported by the underlying hardware 310 is determined by the particular virtual machine implementation, and reflected in the way the bytecodes are interpreted or JIT-compiled. Other elements of the runtime system include thread management (e.g., scheduling) and garbage collection mechanisms.

EMBODIMENT OF COMPUTER EXECUTION ENVIRONMENT (HARDWARE)

Figure 4:
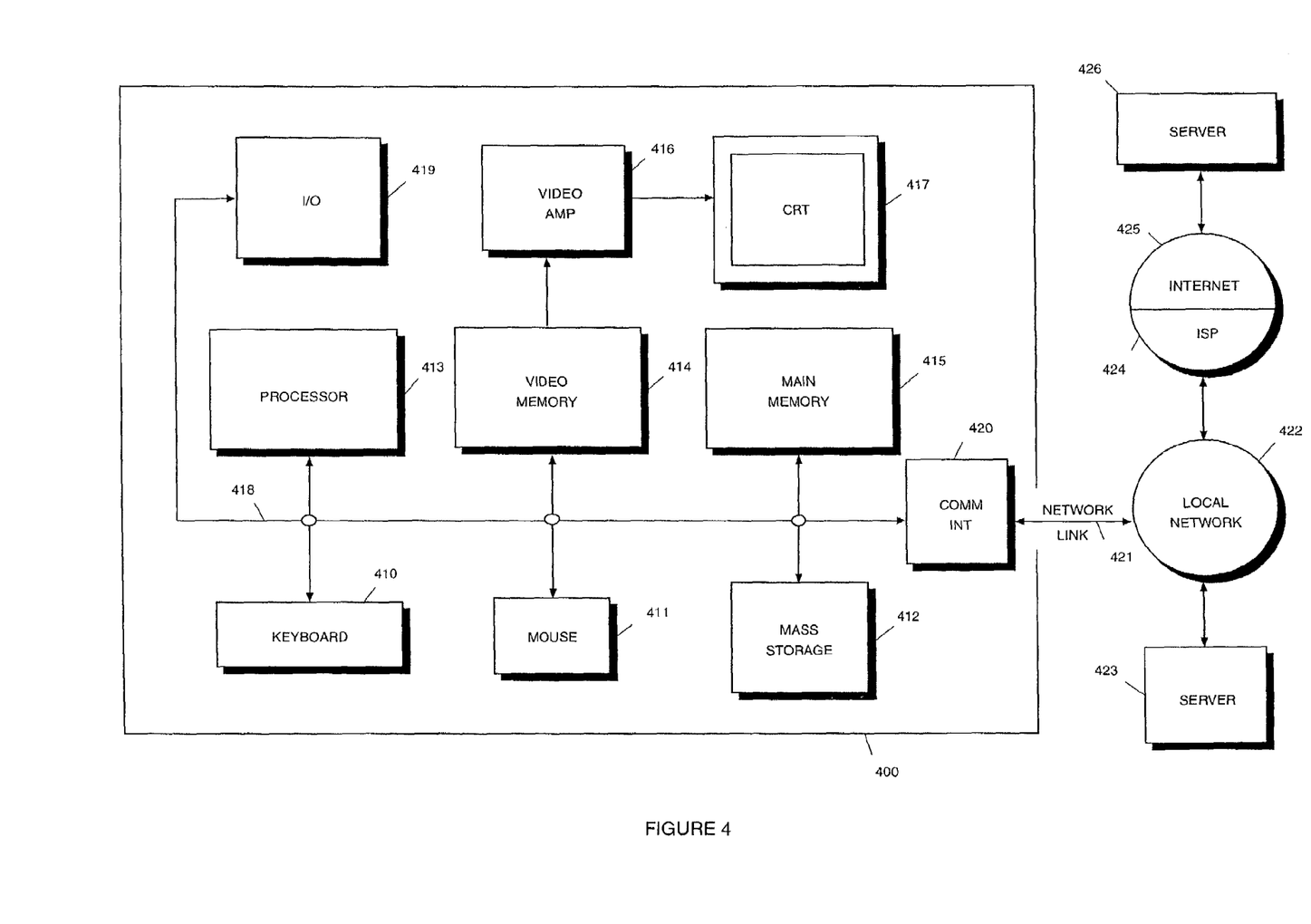
FIG. 4 is a block diagram of one embodiment of a computer system capable of providing a suitable execution environment for an embodiment of the invention.

An embodiment of the invention can be implemented as computer software in the form of computer readable code executed on any computer processing platform, or in the form of software (e.g., bytecode class files) that is executable within a runtime environment running on such a processing platform. An embodiment of the invention may be implemented in any type of computer system or programming or processing environment, including embedded devices (e.g., web phones, set-top boxes, etc.) and "thin" client processing environments (e.g., network computers (NC's), etc.). An example of a general computer system is illustrated in FIG. 4. The computer system described below is for purposes of example only.

In FIG. 4, keyboard 410 and mouse 411 are coupled to a system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to system bus 418 represents such I/O elements as a printer, A/V (audio/video) I/O, etc.

Computer 400 includes a video memory 414, main memory 415 and mass storage 412, all coupled to system bus 418 along with keyboard 410, mouse 411 and processor 413. The mass storage 412 may include both fixed and removable media, such as magnetic, optical or magnetic optical storage systems or any other available mass storage technology. Bus 418 may contain, for example, address lines for addressing video memory 414 or main memory 415. The system bus 418 also includes, for example, a data bus for transferring data between and among the components, such as processor 413, main memory 415, video memory 414 and mass storage 412. Alternatively, multiplexed data/address lines may be used instead of separate data and address lines.

In one embodiment of the invention, the processor 413 is a SPARC™ microprocessor from Sun Microsystems, Inc. or a microprocessor manufactured by Intel, such as the 80×86, or Pentium processor, or a microprocessor manufactured by Motorola, such as the 680x0 processor. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images. Alternatively, the video memory could be used to drive a flat panel or liquid crystal display (LCD), or any other suitable data presentation device.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Communication interface 420 could also be a cable modem or wireless interface. In any such implementation, communication interface 420 sends and receives electrical, electromagnetic or optical signals which carry digital data streams representing various types of information.

Network link 421 typically provides data communication through one or more networks to other data devices. For example, network link 421 may provide a connection through local network 422 to local server computer 423 or to data equipment operated by an Internet Service Provider (ISP) 424. ISP 424 in turn provides data communication services through the world wide packet data communication network now commonly referred to as the "Internet" 425. Local network 422 and Internet 425 both use electrical, electromagnetic or optical signals which carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, remote server computer 426 might transmit a requested code for an application program through Internet 425, ISP 424, local network 422 and communication interface 420.

The received code may be executed by processor 413 as it is received, and/or stored in mass storage 412, or other non-volatile storage for later execution. In this manner, computer 400 may obtain application code in the form of a carrier wave. Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Thus, a method and apparatus for support of Java Lightweight devices on set top boxes have been described in conjunction with one or more specific embodiments. The invention is defined by the claims and their full scope of equivalents.

The invention claimed is:

1. In a computer system having one or more processors, a method for presenting focus events to Lightweight components by use of any available navigation method, comprising:
   creating a pseudo native windowing system widget for a Lightweight component executing in a virtual machine, wherein said Lightweight component is a component without a native opaque window association, said Lightweight component visible to said virtual machine and transparent to a native windowing system of said computer system and
   providing said pseudo native windowing system widget to said native windowing system such that said native windowing system attaches a native structure to said Lightweight component, said native structure enabling said Lightweight component to be visible to and focus navigable by said native windowing system,
   wherein said native windowing system maintains a list of its native widgets and said pseudo native windowing widget is included in said native windowing system's list of native widgets.

2. The method of claim 1, further comprising providing focus events to said pseudo native windowing system widget.

3. The method of claim 2 wherein said pseudo native windowing system widget informs said Lightweight component to assume said focus events.

4. The method of claim 2 wherein said focus events are provided by cursor keys on a computer system keyboard.

5. The method of claim 2 wherein said focus events are provided by any combination of keys on a computer system keyboard.

6. The method of claim 1 wherein said Lightweight component is device independent.

7. A computer program product comprising:
   a computer readable storage medium having computer program code embodied therein for presenting focus events to Lightweight components, said computer readable storage medium comprising computer program code configured to cause a computer to:
   create a pseudo native windowing system widget for a Lightweight component, wherein said Lightweight component is a component without a native opaque window association, said Lightweight component visible to a virtual machine and transparent to a native windowing system of said computer; and
   provide said pseudo native windowing system widget to said native windowing system such that said native windowing system attaches a native structure to said Lightweight component, said native structure enabling said Lightweight component to be visible to and focus navigable by said native windowing system,
   wherein said native windowing system maintains a list of its native widgets and said pseudo native windowing system widget is included in said native windowing system's list of native widgets.

8. The computer program product of claim 7, further comprising providing focus events to said pseudo native windowing system widget.

9. The computer program product of claim 8 wherein said pseudo native windowing system widget informs said Lightweight component to assume said focus events.

10. The computer program product of claim 8 wherein said focus events are provided by cursor keys on a computer system keyboard.

11. The computer program product of claim 8 wherein said focus events are provided by any combination of keys on a computer system keyboard.

12. The computer program product of claim 7 wherein said Lightweight component is device independent.

13. An apparatus for focus navigating Lightweight components comprising:
  a client computer;
  a virtual machine on said client computer;
  a native windowing system on said client computer having Lightweight components, wherein each of said Lightweight components is a component without a native opaque window association and is transparent to the native windowing system on said client computer, each of said Lightweight components being visible to and executing on said virtual machine;
  a mechanism for creating pseudo native windowing system widgets for said Lightweight components such that the native windowing system attaches a native structure to one or more of said Lightweight components, said native structure enabling said one or more Lightweight components to be visible and focus navigable by said native windowing system,
  wherein said native windowing system maintains a list of its native widgets and said pseudo native windowing system widgets are included in said native windowing system's list native of widgets.

14. The apparatus of claim 13, further comprising providing focus events to said pseudo native windowing system widget.

15. The apparatus of claim 14 wherein said pseudo native windowing system widget informs said Lightweight component to assume said focus events.

16. The apparatus of claim 14 wherein said focus events are provided by cursor keys on a computer system keyboard.

17. The apparatus of claim 14 wherein said focus events are provided by any combination of keys on a computer system keyboard.

18. The apparatus of claim 13 wherein said Lightweight component is device independent.

* * * * *